Dec. 20, 1960 J. W. MORRIS 2,965,527
PRESSING OF CURVED LAMINATED GLASS ASSEMBLIES
Filed Aug. 19, 1955

INVENTOR.
JOHN W. MORRIS
BY
Oscar L Spencer
ATTORNEY

United States Patent Office 2,965,527
Patented Dec. 20, 1960

2,965,527

PRESSING OF CURVED LAMINATED GLASS ASSEMBLIES

John W. Morris, Tarentum, Pa., assignor to Pittsburgh Plate Glass Company, a corporation of Pennsylvania Filed Aug. 19, 1955, Ser. No. 529,414

19 Claims. (Cl. 154—2.73)

This invention relates to the pressing of a curved laminated glass assembly comprising two matched sheets of curved glass and a thermoplastic interlayer to bond the interlayer to the glass sheets substantially throughout the entire area of the assembly.

Curved laminated glass assemblies have been developed for various uses especially as curved windshields for automobiles. Initially the curved windshields had a longitudinal curvature that was relatively constant from one end to the other. Then curved laminated glass windshields were developed in which the portions of the end sections of the windshield adjacent the central section had a substantially smaller radius of curvature than any of the other portions. Further development resulted in curved laminated glass windshields in which the end sections of these wrap-around windshields were twisted or bent about the longitudinal axis. Other developments included the provision in the laminated glass assemblies of a transverse curvature as well as the longitudinal curvature with or without the end sections being twisted about the longitudinal axis. Thus, various designs of wrap-around windshields, some of which are known as compound windshields because of the transverse curvature, have been developed.

Initially laminated glass assemblies were flat and were treated to bond the plastic interlayer to the opposing surfaces of the glass sheets by passing the assembly after heating through a pair of resilient nipper rolls. With the development of curved laminated glass assemblies, it was at first necessary to place the assembly within an oil-resistant plastic bag and then the bag was sealed and followed by evacuation of the bag for removal of the air from between the thermoplastic interlayer and the glass sheets. The sealed evacuated bag with its contents was placed in an oil which was then heated to an elevated temperature and subjected to an elevated pressure. It should be mentioned that when the flat glass laminated assemblies were treated for sealing of the marginal edge by heating and passing through the pair of nipper rolls, the resulting pressed product which was known as a prepressed laminated assembly was placed in direct contact with the oil and subjected to said elevated temperature and pressure.

With the development of the more complex type of laminated glass assemblies developed for windshields, as described above, modifications of the apparatus utilizing yieldable nipper rolls became necessary. However, the yield of satisfactory prepressing of these windshields was low and the degree of breakage in this prepressing was high. Similarly, the use of the plastic bag evacuation method for protecting the laminating assembly from penetration of oil during lamination or final pressing was not satisfactory. During the evacuation in the plastic bag the glass sheets were pulled against the plastic interlayer when the air was removed and defects in matching of the two sheets of glass would result in breakage. Furthermore, the handling of these plastic bags with the large laminated glass assemblies therein would result in some breakage. In both cases, the breakage would not be detectable until the bag and its contents had been subjected to the autoclave or final pressing treatment in the oil and the contents then removed from the bag. This meant the autoclave equipment was being used for lamination of assemblies already broken thus preventing the maximum utilization of the autoclave equipment.

It is an object of the present invention to provide a method for the pressing of a curved laminated glass assembly that does not require a preliminary pressing and, therefore, reduces the chance of glass breakage by reducing handling of the assembly.

It is another object of the present invention to provide a method for the pressing of a curved laminated glass assembly that eliminates the manual labor involved in transferring the prepressed laminated assemblies to the final pressing operation.

It is a further object of this invention to provide a method that requires no change in method or equipment with change in type or pattern of windshield to be laminated.

It is still a further object of the present invention to provide a method for the pressing of curved laminated glass assemblies that eliminates the use of plastic bags and the glass breakage resulting from their use.

Another object of the present invention is to provide a method that is readily adaptable to a semicontinuous scale or a continuous scale of plant production.

Other objects of the invention will be apparent to one skilled in the art from the description which follows when taken in conjunction with the drawings in which.

Figure 1:
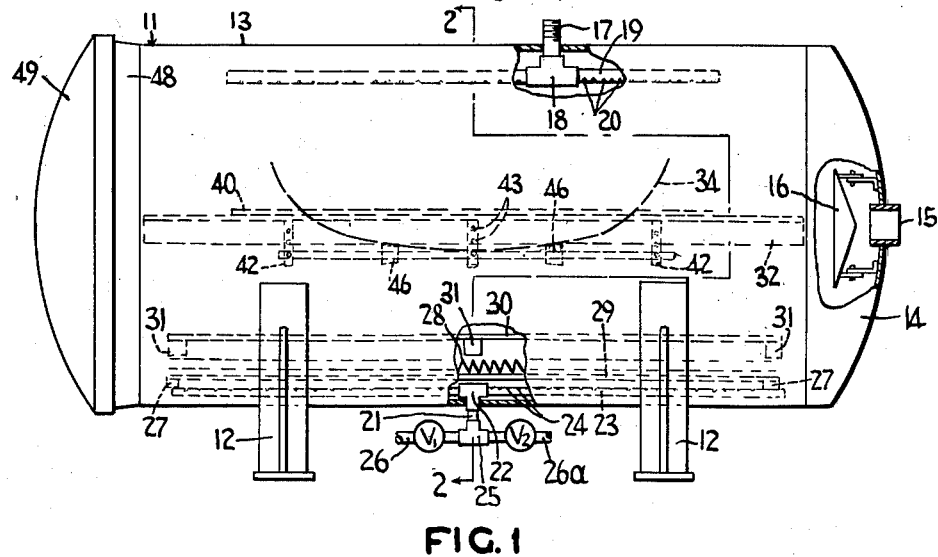
Fig. 1 is a front elevation, partially broken away, of a form of apparatus for carrying out, on a batch scale, the method of the invention.

In accordance with the method of the present invention, a curved laminated glass assembly comprising two matched sheets of curved glass and a thermoplastic interlayer is treated to form an assembly having the thermoplastic interlayer, such as Vinal (plasticized polyvinyl butyral), bonded to both glass sheets substantially throughout the entire area. In the method, the laminated glass assembly is placed in a chamber which is then evacuated, for example, to a vacuum of at least 10 inches of mercury and preferably at least 15 inches of mercury. After the chamber has been evacuated to the desired vacuum or with the start of the evacuation step, heating of the gas within the chamber with or without radiant heating of the assembly is started to raise the temperature of the curved laminated glass assembly to an elevated temperature, for example, about 190 to 350° F. and preferably about 225 to 350° F. During the entire heating of the laminated glass assembly to the elevated temperature, the evacuation step is preferably continued.

In a preferred embodiment during the heating step, a gas, such as air and steam, is bled into the chamber. Of course, when a gas is bled into the chamber it is necessary to continue the evacuation step. Furthermore, the bleeding of the gas into the chamber reduces the degree of vacuum obtainable, but the bleeding of the gas into the chamber has a desirable result, namely, it provides a more uniform heating of the laminated glass assembly. When using steam as the gas being bled into the chamber, the assembly is heated in the evacuated chamber until the assembly is at a temperature of at least about 150° F.

When the laminated glass assembly has been heated to the desired elevated temperature in the evacuated chamber, the vacuum is released while maintaining the assembly at the elevated temperature. The chamber is then pressurized by adding a gas that is preferably heated. The temperature of the heated gas is preferably about 190 to 350° F. The heat capacity of a gas is low and thus the introduction of unheated gas does not affect the temperature of the assembly appreciably. Of course, maintenance of the assembly at the desired temperature can be provided by other means, such as by electrical heaters. The gas is introduced to raise the pressure in the chamber, for example, to an elevated or superatmospheric pressure of at least 50 pounds per square inch and preferably about 100 to 250 pounds per square inch. Best results are obtained when the pressure is about 175 to 225 pounds per square inch. The laminated glass assembly is maintained at the elevated temperature and the chamber is maintained at the elevated pressure for a period of time sufficient to seal or bond the interlayer to the glass sheets substantially throughout the entire area of the laminated assembly. At the higher temperatures, cooling of the laminated assembly can be started immediately after the application of the elevated pressure, if the pressure is sufficiently great. This can be seen from the example described below. When the sealing or bonding has been accomplished, it is necessary to cool the bonded laminated glass assembly in the chamber while maintaining the elevated pressure. If the pressure was not maintained, there was boiling in the interlayer. This boiling would produce an unsatisfactory windshield or other curved laminated glass assembly. After cooling the bonded laminated glass assembly to the desired temperature, such as a maximum of about 175° F., and preferably a maximum of about 150° F., the pressure is released and the bonded laminated glass assembly is removed from the chamber. The assembly is then examined visually for bonding. If the assembly is bonded clear throughout the area, it is suitable for shipment without any further processing except packaging.

Figure 2:
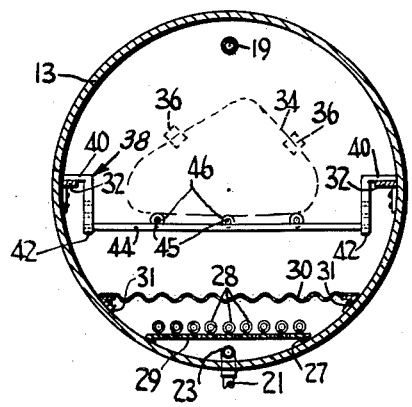
Fig. 2 is a cross section of Fig. 1 taken along line 2—2 to include an end elevation of the laminated glass assembly being treated.
Figure 3:
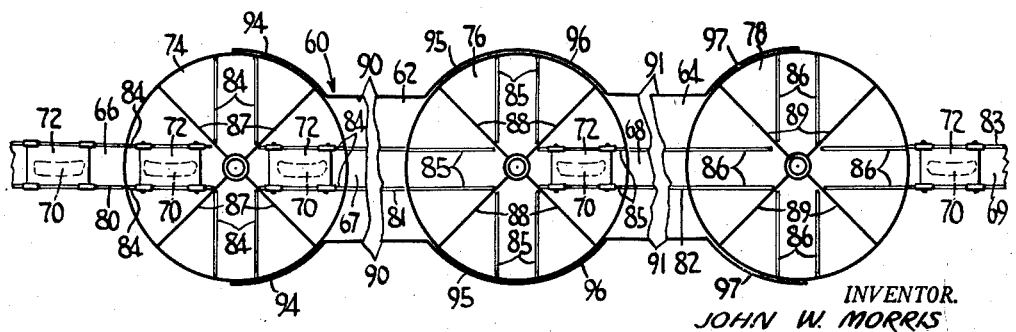
Fig. 3 is a schematic drawing, in a top plan view, of apparatus for conducting the method on a continuous scale.

Referring now to the drawings, it is seen that Figs. 1 and 2 illustrate the apparatus for a batch operation of the invention and Fig. 3 illustrates schematically an apparatus for a continuous operation of the present invention. Pressure chamber of Figs. 1 and 2 is generally indicated at 11. Chamber 11 is on supports 12 and has a central cylindrical wall 13 and a fixed end 14. Air inlet 15 is mounted in fixed end 14 and deflector 16 is mounted to and spaced from the inside wall of end 14 in alignment with inlet 15. An outlet pipe 17 passes through the top of wall 13 and is connected to a vacuum pump (not shown). Pipe 17 is connected by means of coupling 18 to distributor pipe 19 extending longitudinally in chamber 11 and closed at both ends and having spaced holes 20 on its underside.

Inlet pipe 21 is connected to one arm of coupling 22 extending through the bottom of wall 13. Pipe 21 is connected by means of coupling 22 to distributor pipe 23 extending longitudinally within chamber 11. Spaced holes 24 are on the top side of pipe 23. Pipe 21 is connected by coupling 25 to pipes 26 and 26a that contain valves V₁ and V₂ respectively. Pipe 26 is a bleedoff pipe. Pipe 26a is connected to a high pressure gas source (not shown). Inlet pipe 15 is also connected to the high pressure gas source.

Supports 27 are longitudinally spaced along two sides of the bottom portion of wall 13 and support coil heater 28 on perforated transite (asbestos cement) board 29. Above and parallel to coil heater 28 is an aluminum corrugated sheet 30 supported on and spaced from both sides of the inner surface of wall 13 by longitudinally spaced supports 31.

Above corrugated sheet 30 is mounted on the inner surface of wall 13 longitudinal rails 32 for supporting curved laminated glass assembly 34. Clamps 36 (shown in Fig. 2) maintain the components, namely, the two glass sheets and thermoplastic interlayer, in alignment and in abutting relationship to the extent possible throughout the area of curved laminated glass assembly 34. By means of an assembly support generally indicated at 38, curved laminated glass assembly 34 is supported on rails 32. Support 38 comprises frame members 40 resting on rails 32 and provided with spaced downwardly extending flanges 42. Flanges 42 are provided with holes 43 for providing adjustable support of horizontal transverse bars 44. Longitudinal support bars 45 rest on bars 44 and are provided with frustoconical collars 46. Assembly 34 rests on collars 46 and is adequately supported thereby while minimizing the area of the support to provide a maximum uniformity of heating during the method of the present invention. The end 48 of chamber 11 opposite end 14 is provided with a swinging door 49 which can be brought into sealing engagement with end 48, as shown in Fig. 1.

Referring to Fig. 3, the apparatus has a treating chamber generally indicated at 60 that includes a vacuum chamber 62 and a presure chamber 64. A loading conveyer 66 is placed at one end of chamber 60 near vacuum chamber 62. Vacuum chamber 62 is provided with a conveyer 67 and pressure chamber 64 is provided with a conveyer 68. An unloading conveyer 69 is at the other end of treating chamber 60 and near pressure chamber 64. Curved laminated glass assemblies 70 are supported on wheeled carriages 72 that are moved from left to right in the drawings by means of conveyers 66, 67, 68 and 69.

Treating chamber 60 is provided with a revolving door 74 between vacumm chamber 62 and loading conveyer 66. Chamber 60 is provided with a revolving door 76 between vacuum chamber 62 and pressure chamber 64. Chamber 60 is also provided with a revolving door 78 between pressure chamber 64 and unloading conveyer 69. Conveyers 66, 67, 68 and 69 are provided with rails 80, 81, 82 and 83, respectively. Revolving doors 74, 76, and 78 are provided with rails 84, 85, and 86, respectively. Between each pair of rails 84 of revolving door 74 is a wall 87. Between each pair of rails 85 of revolving door 76 is a wall 88. Between each pair of rails 86 of revolving door 78 is a wall 89. Thus, walls 87, 88 and 89 divide doors 74, 76 and 78, respectively, into a number of sections. It can be seen from Fig. 3 that carriages 72 can move along rails 80, then onto rails 84. Carriage 72 is moved along conveyer 66 on rails 80 by a means (not shown). Similarly, obvious means can be utilized for transferring carriage 72 from conveyer 66 into revolving door 74. When door 74 has made a turn of 180° by suitable means (not shown), carriage 72 can be pushed from rails 84 onto rails 81 of conveyer 67 in vacuum chamber 62. Similar transfer along conveyer 67, through door 76, along conveyer 68, through revolving door 78, and finally onto unloading conveyer 69 can be utilized.

In order that revolving doors 74, 76 and 78 provide a substantial sealing off of vacuum chamber 62 from pressure chamber 64 and each from the outside at the end of chamber 60, side walls 90 and 91 of vacuum and pressure chambers 62 and 64, respectively, are provided with curved extensions 94 and 95 for side walls 90 and curved extensions 96 and 97 for side walls 91. Walls 87, 88 and 89 of revolving doors 74, 76 and 78, respectively, slide in sealing engagement with curved extensions 94, 95, 96 and 97. By this design, the amount of loss of vacuum in chamber 62 to the outside or to pressure chamber 64 and the amount of escape of gas under pressure from chamber 64 to chamber 62 or to the outside is minimized.

With the apparatus of Fig. 3 assemblies 70 supported on racks (not shown) of carriages 72 are conveyed through vacuum chamber 62 where they are subjected to a vacuum and heated to the elevated temperature described above. The length of chamber 62 and the speed of movement through chamber 62 is chosen so that at this point the carriage is transferred to chamber 64 through door 76. In chamber 64, assembly 70 is subjected to the elevated temperature and pressure, as described above in connection with the method. At the exit section of chamber 64, the assemblies 70 are cooled before passage out of chamber 64 through revolving door 78 to the outside.

*Example*

Using the apparatus of Figs. 1 and 2, and using six steel spring-clamps each having a two-inch wide jaw, most of the clamps being used on the end sections of the laminated assembly, a number of wrap-around windshields of the type for the 1955 Dodge and Plymouth automobiles were treated one at a time as follows:

The wrap-around windshield was placed on assembly support 38 which had been pulled partly out of chamber 11 by sliding along rails 32. The six clamps were applied. Support 38 with windshield 34 thereon was slid on rails 32 into chamber 11. Swinging door 49 was closed. Vacuum was applied to chamber 11 evacuating air through pipe 17. A vacuum source of 28 inches of mercury was used. As soon as evacuation was started, air was bled into chamber 11 through pipe 26a and partially opened valve $V_2$ (valve $V_1$ being closed), pipe 21 and distributor pipe 23. Evacuation was continued and the amount of bleeding of air was adjusted to reach and maintain a vacuum of about 22 inches of mercury in chamber 11. The air being bled into chamber 11 passed over heater 28 and around corrugated sheet 30 and then over laminated glass assembly 34 and finally out distributor pipe 19 and through outlet pipe 17. When the electrical heaters and the bleeding of air were started simultaneously with evacuation, it took 15 minutes to heat the assembly 34 to a temperature of 260° F. This time included the two minutes normally required to obtain the desired vacuum in chamber 11.

When windshield 34 had reached a temperature of 260° F., the vacuum pump was stopped and pipe 17 was closed by valve (not shown). Air at 200 p.s.i. and heated to about 260° F. was immediately introduced into chamber 11 by inlet pipe 15 until the pressure of chamber 11 was 200 pounds per square inch. Coil heater 28 was continued in operation. In some of the tests the 200-p.s.i. air introduced was at room temperature, but it did not appreciably cool windshield 34. Three minutes were required to increase the pressure of chamber 11 to 200 pounds per square inch. Immediately after the pressure was obtained, windshield 34 was cooled to 150° F. in the chamber while maintaining the 200 pounds per square inch pressure by passing 200-p.s.i. air through chamber 11 by means of pipe inlet 15 and pipe 21 now communicating with the bleedoff pipe 26 with valve $V_1$ partially opened and valve $V_2$ in pipe 26a closed. When windshield 34 was cooled to 150° F., the passage of 200 pounds per square inch air through pipe 15 and into chamber 11 was discontinued. Valve $V_1$ was opened wide to release the pressure to atmospheric pressure. Door 49 was opened and support 38 with windshield 34 thereon was removed from chamber 11. Windshield 34 was removed from support 38 and clamps 36 were removed from windshield 34.

The wrap-around windshields of the type for the 1955 Dodge and Plymouth automobiles treated as described above had a clear seal throughout the entire area and thus indicated satisfactory bonding of the thermoplastic interlayer to the glass sheets. Some of these wrap-around windshields were subjected to the 2-hour boil test (American Standards Association Code for Safety Glazing Materials Z26.1, 1950, Test No. 4). These windshields showed satisfactory heat stability in this test. A number of the windshields were also subjected to the 0° F. crush test for adhesion and found to be satisfactory.

In the foregoing example, the wrap-around windshields were subjected to heating from the start of the application of vacuum. Of course, vacuum can be and has been applied before any heating is started. The windshield was also successfully bonded or pressed with the method as modified.

In another variation of the test that was successful, the windshields were heated by bleeding steam into the chamber after the windshield had reached a temperature of 150° F. Steam was then continued until the desired temperature was obtained.

In other successful variations, no gas such as air or steam was bled into the chamber. In this case, the aluminum corrugated sheet 30 prevented any radiant heating. Because of the low vacuum the rate of heating of the windshield was quite slow; however, satisfactory bonding was obtained with this modification. In a further modification, the aluminum corrugated sheet which was serving as the shield against radiant heating was removed and faster heating of the windshield was obtained although the uniformity of heating was not as good. However, satisfactorily pressed or bonded windshields were obtained.

Satisfactorily pressed or bonded wrap-around windshields have been prepared in accordance with the example described above or various modifications also described above, but utilizing a different temperature, for example 290° F. In addition, experiments on laminating glass assemblies have been successfully carried out with pressures as low as 50 pounds per square inch. It was found that the better the degree of matching of the curved assemblies, the lower can be the pressure utilized for satisfactory pressing or bonding.

Satisfactory pressing or bonding by the method of the present invention as described above has been accomplished on windshields, i.e. windshields with compound curvature in the central section as well as the ordinary wrap-around windshields.

It was found that when the matched sheets of the various types of curved windshields are greater than 0.003 inch between the sheets in portions of the windshield it is necessary to use a higher pressure than would be otherwise needed for the pressing operation. It has also been found desirable in such cases to increase the thickness of the thermoplastic interlayer of sheet being used. Ordinarily, an interlayer sheet thickness of 0.015 inch is used. Successful bonding has been carried out with less satisfactorily matched curved windshields by using a Vinal interlayer sheet that was 0.030 inch in thickness.

It has been found that the highest yield of curved windshields can be obtained in the method of this invention for bonding when the thermoplastic interlayer has been given a pretreatment. It was discovered that if the interlayer, e.g. Vinal, sheet is placed in chamber 11 without heating and subjected to an elevated pressure, such as 200 pounds per square inch, followed by assembly of the interlayer between the two matched sheets of curved glass and then treating of the assembly as described above, a higher yield of satisfactorily bonded curved laminated glass windshields is obtained.

While various examples and modifications of the present invention have been described above, these examples and modifications are merely for purposes of illustration and not by way of limiting the invention. The present invention is limited only by the claims which follow.

I claim:

1. The method of pressing a curved laminated glass assembly comprising two matched sheets of curved glass and a thermoplastic interlayer to form a bonded laminated assembly, which comprises placing the laminated glass assembly in air in a chamber, closing the chamber, withdrawing air from the chamber to provide an evacuated chamber, heating the assembly in the evacuated chamber to an elevated temperature, releasing the vacuum while maintaining the assembly at an elevated temperature, introducing a gas into the chamber in direct contact with the assembly at the elevated temperature to provide a superatmospheric gaseous pressure, maintaining the assembly at an elevated temperature in the chamber at a superatmospheric gaseous pressure only for a sufficient period of time to seal the interlayer to the glass sheets substantially throughout the entire area of the laminated assembly, cooling the chamber while maintaining the superatmospheric gaseous pressure until the bonded laminated glass assembly is cooled to a maximum temperature of about 175° F., releasing the superatmospheric gaseous pressure in the chamber, and removing the bonded laminated glass assembly from the chamber.

2. The method of claim 1 wherein the gas added to the chamber to provide the superatmospheric gaseous pressure is air.

3. The method of claim 1 wherein the gas added to the chamber to provide a superatmospheric gaseous pressure is steam.

4. The method of pressing a curved laminated glass assembly comprising two matched sheets of curved glass and a thermoplastic interlayer to form a bonded laminated assembly, which comprises placing the laminated glass assembly in air in a chamber, closing the chamber, withdrawing air from the chamber to provide an evacuated chamber, heating the assembly in the evacuated chamber to an elevated temperature of about 190 to 350° F. while maintaining a vacuum, releasing the vacuum while maintaining the assembly at said elevated temperature, introducing air into the chamber in direct contact with the assembly at the elevated temperature to provide a superatmospheric air of at least 50 pounds per square inch, maintaining the assembly at said elevated temperature in the chamber at said superatmospheric air pressure only for a sufficient period of time to seal the interlayer to the glass sheets substantially throughout the entire area of the laminated assembly, cooling the chamber while maintaining the superatmospheric air pressure until the bonded laminated glass assembly is cooled to a maximum temperature of about 175° F., releasing the superatmospheric air pressure in the chamber, and removing the bonded laminated glass assembly from the chamber.

5. The method of pressing a curved laminated glass assembly comprising two matched sheets of curved glass and a thermoplastic interlayer to form a bonded laminated assembly, which comprises placing the laminated glass assembly in air in a chamber, closing the chamber, withdrawing air from the chamber to provide a vacuum of at least 10 inches of mercury while heating the assembly, continuing the heating of the assembly in the evacuated chamber to an elevated temperature of about 190 to 350° F., releasing the vacuum while maintaining the laminated glass assembly at the elevated temperature, introducing a gas into the chamber in direct contact with the assembly at the elevated temperature to provide a superatmospheric gaseous pressure of at least 50 pounds per square inch, maintaining the laminated glass assembly at said elevated temperature and the chamber at said superatmospheric gaseous pressure only for a sufficient period of time to seal the interlayer to the glass sheets substantially throughout the entire area of the laminated assembly, cooling the chamber while maintaining said superatmospheric gaseous pressure until the bonded laminated glass assembly is cooled to a maximum temperature of about 175° F., releasing the superatmospheric gaseous pressure in the chamber, and removing the bonded laminated glass assembly from the chamber.

6. The method of claim 5 wherein the superatmospheric gaseous pressure is between about 100 and 250 pounds per square inch.

7. The method of claim 6 wherein the elevated temperature is about 225 to 300° F.

8. The method of claim 5 wherein the evacuation of the chamber is to a vacuum of at least 15 inches of mercury, the elevated temperature is about 225 to 300° F., and the superatmospheric gaseous pressure is about 175 to 225 pounds per square inch.

9. The method of pressing a curved laminated glass assembly comprising two matched sheets of curved glass and a thermoplastic interlayer to form a bonded laminated glass assembly, which comprises placing the laminated glass assembly in air in a chamber, closing the chamber, withdrawing air from the chamber to provide and maintain a vacuum of at least 10 inches of mercury, heating the assembly in the chamber while bleeding a heated gas into the chamber in direct contact with the assembly at the elevated temperature and continuing gas removal to maintain said vacuum, said heating of the assembly being continued with said bleeding and evacuating until the temperature of the laminated glass assembly is about 190 to 350° F., releasing the vacuum while maintaining the elevated temperature, introducing a gas into the chamber in direct contact with the assembly to provide a superatmospheric gaseous pressure of at least about 50 pounds per square inch, maintaining the assembly at the elevated temperature in the chamber at the superatmospheric gaseous pressure only for a sufficient period of time to seal the interlayer to the glass sheets substantially throughout the entire area of the laminated glass assembly, cooling the chamber while maintaining said superatmospheric gaseous pressure until the bonded laminated glass assembly is cooled to a maximum temperature of about 175° F., releasing the superatmospheric gaseous pressure in the chamber, and removing the bonded laminated glass assembly from the chamber.

10. The method of claim 9 wherein the gas bled into the chamber while maintaining the vacuum during the heating of the laminated glass assembly is heated air.

11. The method of claim 9 wherein the gas being bled into the chamber while maintaining the vacuum during the heating of the laminated glass assembly is steam and the bleeding of steam into the chamber is started when the laminated glass assembly is heated at least to about 150° F.

12. The method of claim 9 wherein the elevated temperature is about 225 to 300° F. and the vacuum maintained in the chamber is at least 15 inches of mercury.

13. The method of claim 12 wherein the superatmospheric gaseous pressure is about 100 to 250 pounds per square inch.

14. The method of claim 9 wherein the air in the chamber is removed to provide and maintain a vacuum of at least 15 inches of mercury and heated air is bled into the chamber during the maintenance of the vacuum in the chamber while heating the laminated glass assembly and wherein the elevated temperature is about 225 to 300° F. and the superatmospheric gaseous pressure is about 175 to 225 pounds per square inch.

15. The method of claim 14 wherein the bonded laminated glass assembly is cooled in the chamber at said superatmospheric gaseous pressure until the temperature of the assembly is a maximum of 150° F.

16. The method of pressing a curved laminated glass assembly comprising two matched sheets of curved glass and a thermoplastic interlayer to form a bonded laminated glass assembly, which comprises placing clamps at the portions of the end sections of the laminated glass assembly to maintain the glass sheets in alignment and against the thermoplastic interlayer, placing the laminated glass assembly with the clamps thereon in air in a chamber, closing the chamber, withdrawing air from the chamber to provide and maintain a vacuum of at least 10 inches of mercury while heating the assembly, bleeding heated air into the chamber in direct contact with the assembly at the elevated temperature while maintaining the vacuum in the chamber and continuing the heating until the temperature of the assembly is an elevated temperature of about 190 to 350° F., releasing the vacuum while maintaining the assembly at the elevated temperature, introducing air into the chamber in direct contact with the assembly to provide a superatmospheric air of about 100 to 250 pounds per square inch, maintaining the assembly at the elevated temperature and the chamber at the superatmospheric air pressure only for a sufficient period of time to bond the interlayer to the glass sheets substantially throughout the entire area of the laminated assembly, cooling the chamber while maintaining said superatmospheric air pressure until the bonded laminated glass assembly is cooled to a maximum temperature of about 175° F., releasing the superatmospheric air pressure in the chamber, and removing the bonded laminated glass assembly from the chamber.

17. The method of pressing a curved laminated glass assembly comprising two matched sheets of curved glass and a thermoplastic interlayer to form a bonded laminated assembly, which comprises subjecting the laminated glass assembly in a chamber to a pressure of air directly surrounding the assembly less than atmospheric pressure, heating the assembly in said air in the chamber to an elevated temperature, subjecting the assembly in the chamber at an elevated temperature to direct contact with a gas at a superatmospheric gaseous pressure, maintaining the assembly in the chamber at an elevated temperature under a superatmospheric gaseous pressure only for a sufficient period of time to seal the interlayer to the glass sheets substantially throughout the entire area of the laminated assembly, cooling the bonded laminated glass assembly while maintaining the superatmospheric gaseous pressure until the bonded laminated glass assembly is cooled to a maximum temperature of about 175° F., and releasing the superatmospheric gaseous pressure being imposed on the bonded laminated glass assembly.

18. The method of pressing a laminated glass assembly comprising two sheets of glass and a thermoplastic interlayer to form a bonded laminated assembly, which comprises placing the laminated glass assembly in air in a chamber, closing the chamber, removing air from the chamber to provide and maintain a vacuum, heating the assembly in the evacuated chamber to an elevated temperature, releasing the vacuum while maintaining the assembly at an elevated temperature, introducing a gas into the chamber in direct contact with the assembly at the elevated temperature to provide a superatmospheric gaseous pressure, maintaining the assembly at an elevated temperature in the chamber at a superatmospheric gaseous pressure only for a sufficient period of time to seal the interlayer to the glass sheets substantially throughout the entire area of the laminated assembly, cooling the chamber while maintaining the superatmospheric gaseous pressure until the bonded laminated glass assembly is cooled to a maximum temperature of about 175° F., releasing the superatmospheric gaseous pressure in the chamber, and removing the bonded laminated glass assembly from the chamber.

19. The continuous method of pressing a curved laminated glass assembly comprising two matched sheets of curved glass and a thermoplastic interlayer to form a bonded laminated assembly, which comprises moving the laminated glass assembly through a gas in a zone maintained at a vacuum of at least 10 inches of mercury and at an elevated temperature, a zone maintained at a superatmospheric gaseous pressure only and an elevated temperature of about 190–350° F., and then a zone maintained at a superatmospheric gaseous pressure and at a temperature substantially below about 190° F.

References Cited in the file of this patent

UNITED STATES PATENTS

| | | |
|---|---|---|
| 1,539,239 | Bull | May 26, 1925 |
| 2,054,864 | Owen | Sept. 22, 1936 |
| 2,374,040 | Ryan | Apr. 17, 1945 |
| 2,401,299 | Glavin | June 4, 1946 |
| 2,714,567 | Cravener | Aug. 2, 1955 |

FOREIGN PATENTS

| | | |
|---|---|---|
| 323,783 | Great Britain | Jan. 8, 1930 |
| 334,858 | Great Britain | Sept. 8, 1930 |
| 341,631 | Great Britain | Jan. 22, 1931 |